Feb. 17, 1959        R. A. FANTI        2,873,933

AIRFOIL TEMPERATURE CONTROL MEANS

Filed April 23, 1957

INVENTOR
ROY A. FANTI

BY *Leonard F. Wellind*
ATTORNEY 2,873,933

AIRFOIL TEMPERATURE CONTROL MEANS

Roy A. Fanti, Springfield, Mass., assignor to United Aircraft Corporation, East Hartford, Conn., a corporation of Delaware Application April 23, 1957, Serial No. 654,521

11 Claims. (Cl. 244—117)

This invention relates to airfoils and more particularly to airfoils which are subject to deterioration of their torsional stiffness as a result of being subject to an external heat source.

It is an object of this invention to provide a means for maintaining high torsional stiffness of airfoils which may be subject to external heating such as aerodynamic heating.

It is a further object of this invention to provide a heat exchanger means running spanwise of an airfoil, which airfoil may be subject to nonuniform internal heating as a result of external heating, thereby maintaining, a uniform temperature distribution in a chordwise direction.

These and other objects of this invention will become readily apparent from the drawing in which.

Figure 1:
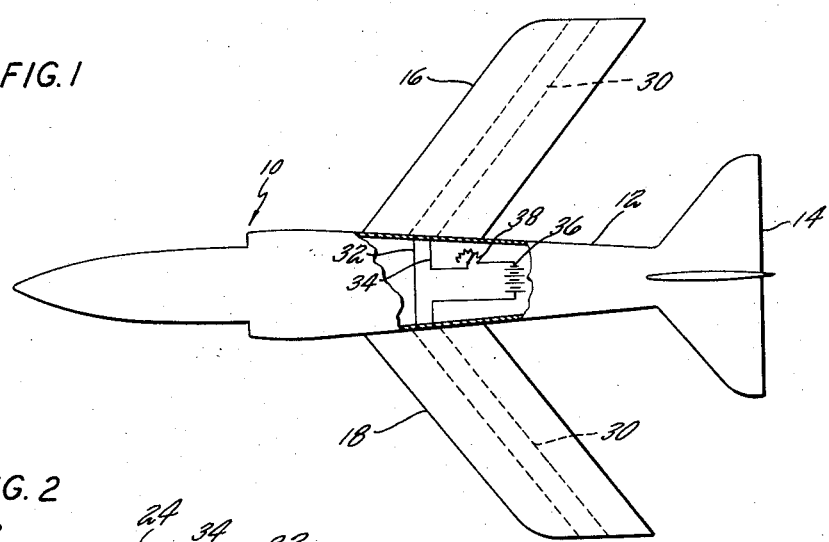
Fig. 1 is a schematic illustration of a high-speed aircraft having wings which may be subject to aerodynamic heating.

It should be understood that, although this disclosure is limited to that of high speed aircraft which may be subject to aerodynamic heating, the principles of this invention are equally applicable to turbomachine blades and to propellers which may be subject to either aerodynamic heating or other external nonuniform heating.

One of the most serious problems encountered in the design of components of high-speed aircraft is that of providing for the deterioration of the physical properties of the structural elements at high temperatures attained through aerodynamic heating. For purposes of discussion and analysis, this problem is conveniently subdivided into two basic considerations. The first consideration is associated with the loss of strength of structural elements obtained as a result of the structure being exposed to elevated temperatures for sufficiently long periods of time that a uniform temperature distribution exists within the structure. For this condition, the use by designers of a reduced modulus of elasticity appropriate to the elevated steady-state temperature suffices to determine the static and dynamic characteristics of the structure. The second consideration is concerned with the loss of strength of structural elements caused by transient thermal stresses which exist as a result of nonuniform temperature distributions within the structure. This latter phenomenon may occur in practice, for example, during changes in flight conditions when a rapid acceleration of the aircraft from a cruise to an attack condition is experienced. The action of these thermal stresses in reducing the stiffness of the structure may be explained briefly as follows:

It is well known that when a solid metal structure with pointed edges (that is( airfoil) is immersed suddenly in a uniform heat source, the thin edges will heat up faster than the massive center of the structure (that is, the point of a needle attains red heat prior to the body of the needle). Because of the temperature gradient within the structure, the hotter portions of the structure are constrained from expanding in the spanwise direction by the cooler center portion of the structure. As a consequence, compressive forces are induced near the thin edges and tensile forces near the thick portion of the structure. If the structure under this condition of thermal stress loading is subjected to a twist deflection, components of the compressive forces provide an incremental torque which acts to increase this twist; components of the tensile forces provide an incremental torque which acts to decrease this twist deflection. The net effect for a solid wing structure is that the twist of the structure may be increased and hence the over-all torsional stiffness of the structure is reduced.

An increase in the torsional stiffness of a structure may be realized by subjecting the structural elements to a nonuniform chordwise temperature distribution in such a manner as to provide a net thermal induced torque which tends to restore the deformed structure to its equilibrium condition or prevent deformation.

Referring to Fig. 1, a typical aircraft is illustrated generally at 10 as having a fuselage 12, a tail section 14, and swept wings 16 and 18 extending laterally from the fuselage 12. The wing 16 at very high Mach numbers may be subject to aerodynamic heating.

Figure 2:
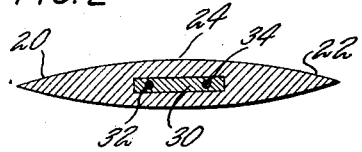
Fig. 2 is a cross section of one of the wings of Fig. 1.

As seen better in Fig. 2, the wings 16 or 18 may comprise a relatively thin leading edge 20 and trailing edge 22 with a relatively thicker intermediate portion 24. When the wing is subject to aerodynamic heating, the leading and trailing edge portions 20 and 22 will tend to heat up both externally and internally at a greater rate than the intermediate thick section 24. In order to maintain a uniform temperature distribution in a chordwise direction, a heating element 30 may be provided in the intermediate portion 24 and provided with a pair of electrical leads 32 and 34. The heating element 30 is symmetrically disposed with respect to the spanwise axis of the wing. The heating element 30 may be supplied with electrical heat provided from a suitable battery 36 and controlled by a rheostat or other suitable mechanism 38. In this manner, when the leading edge and trailing edge portions 20 and 22 begin to heat up faster than the intermediate section 24, heat can be supplied to this section through the heating element or heat exchange 30 so that the temperature distribution in a chordwise direction is maintained substantially uniform. This will prevent deterioration of the torsional stiffness and/or deformation.

Figure 3:
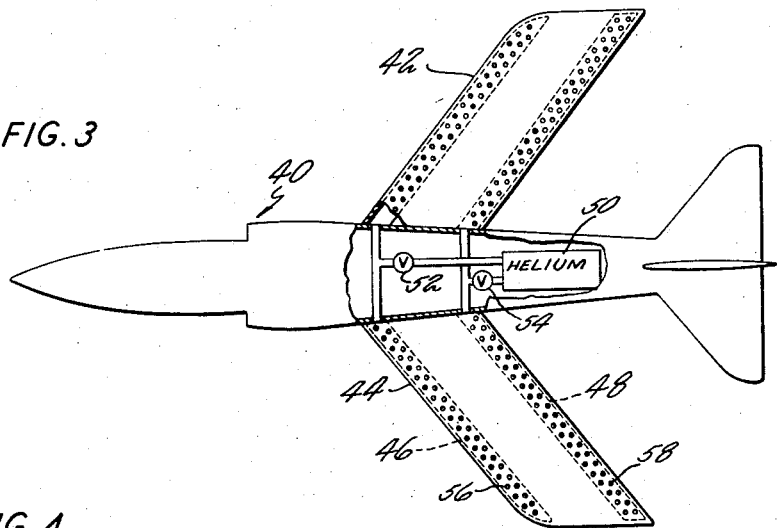
Fig. 3 is a similar to Fig. 1 excepting that spanwise cooling means is provided rather than heating.
Figure 4:
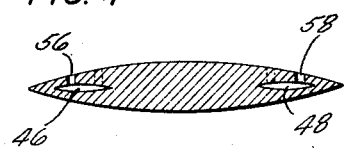
Fig. 4 is a cross section of one of the wings of Fig. 3.

Referring to Figs. 3 and 4, a modification is illustrated with the aircraft 40 having high swept wings 42 and 44 which contain spanwise passages 46 and 48 adjacent the leading and trailing edge sections thereof to provide cooling fluid. The cooling fluid may be obtained from a source such as the tank 50. Valves 52 and 54 are provided for controlling the flow of cooling fluid to the passages 46 and 48 for emission through the plurality of small holes 56 and 58 which are distributed spanwise of the airfoil adjacent the leading and trailing edge sections. These passages emit some of the cooling fluid and further provide additional cooling surfaces.

As shown in Fig. 3, one cooling medium may be a gas such as helium which has high cooling properties.

It is obvious from the drawing that in each instance the temperature varying means extends over only a minor portion of the chordwise extent of the airfoil section.

As a result of this invention, it is apparent that a very simple, yet highly efficient and effective, means has been provided for maintaining the torsional stiffness of airfoil shaped members which may be subject to aerodynamic or other external heating.

Although several embodiments of this invention have been illustrated and described herein, it will be apparent that various changes and modifications may be made in the construction and arrangement of the various parts without departing from the scope of this novel concept.

What it is desired by Letters Patent is:

1. An airfoil having a substantial metal mass and adapted to be exposed to a high external heat source thereby nonuniformly varying the temperature of the airfoil, said nonuniform temperature variation causing a reduction in the torsional stiffness of the airfoil, and means located in said airfoil for internally varying the temperature of the airfoil over a minor portion of the chordwise dimension to maintain a more uniform temperature throughout the chord of the airfoil including internal heat varying mechanism extending over a minor portion of the chordwise dimension of said airfoil and extending over a majority of the span thereof.

2. A solid metal airfoil adapted to be exposed to high aerodynamic heating, said airfoil varying in thickness in a chordwise direction and thereby being subject to internal temperatures which are nonuniform in a chordwise direction, said nonuniform temperature variation causing a reduction in the torsional stiffness of the airfoil, and means for internally varying the temperature of the airfoil to maintain a more uniform temperature throughout the chordwise dimension of the airfoil including internal heat varying mechanism extending over a minor portion of the chordwise dimension of said airfoil and extending spanwise thereof.

3. A solid metal airfoil having relatively thin leading and trailing edge portions and a relatively thicker intermediate portion, said airfoil being subject to nonuniform internal heating when subject to aerodynamic heating externally thereof, said nonuniform heating being such that said leading and trailing edge portions are of a higher temperature than said intermediate portion, and heat exchange means running internally of said airfoil and along the span thereof and in both said leading and trailing edge portions, and means for supplying a coolant to said heat exchange means to maintain a uniform temperature in said airfoil.

4. A solid metal airfoil having relatively thin leading and trailing edge portions and a relatively thicker intermediate portion, said airfoil being subject to nonuniform internal heating when subject to aerodynamic heating externally thereof, said nonuniform heating being such that said leading and trailing edge portions are of a higher temperature than said intermediate portion, and heat exchange means running internally of said airfoil and along the major portion of the span thereof and located in said intermediate portion, said heat exchange means extending over a minor portion of the chordwise dimension of said airfoil, and means for supplying heat to said heat exchanger to maintain a uniform temperature in said airfoil.

5. In a metal airfoil according to claim 4 including an electrical heat supply and means for regulating the supply.

6. A solid metal airfoil having relatively thin leading and trailing edge portions and a relatively thicker intermediate portion, said airfoil being subject to nonuniform internal heating when subject to aerodynamic heating externally thereof, said nonuniform heating being such that said leading and trailing edge portions are of a higher temperature than said intermediate portion, and heat exchange means running internally of said airfoil and along the span thereof and in both said leading and trailing edge portions, means for supplying a coolant to said heat exchange means to maintain a uniform temperature in said airfoil, said coolant comprising a cooling gas, and means for regulating said coolant.

7. In an aircraft having a fuselage and substantially solid metal main sustaining wings extending laterally from said fuselage, said wings having relatively thin leading and trailing edge portions and a relatively thicker intermediate portion, said wings being subject to aerodynamic heating when exposed to an airstream of high Mach numbers, said thin leading and trailing edge portions being subject to higher temperature rise than said intermediate portion, heat exchange means in at least one of said portions of both said wings for maintaining the temperature in said wings substantially uniform in a chordwise direction to avoid reduction in torsional stiffness of the wings, said heat exchange means extending over a minor portion of the chordwise dimension of the wings.

8. In an aircraft according to claim 7 wherein said heat exchange means runs spanwise within said leading and trailing edge portions and including means for conducting a cooling fluid through said heat exchange means from the root toward the tip of said wings.

9. In an aircraft according to claim 7 wherein said heat exchange means runs spanwise of said wings within said intermediate portion and including means for supplying heat to said heat exchange means.

10. In an aircraft according to claim 8 including perforations in said wings running in a spanwise array and adjacent said leading and trailing edge portions and connected to said heat exchange means.

11. An airfoil adapted to be exposed to a high velocity airstream with resultant aerodynamic heating thereby nonuniformly varying the temperature internally of the airfoil whereby the leading and trailing edge portions are increased in temperature, said nonuniform temperature variation causing a reduction in the torsional stiffness of the airfoil, and temperature varying means for internally locally controlling the temperature within only a relatively small portion of the chordwise extent of the airfoil to maintain a more uniform temperature throughout the airfoil including internal heat exchange mechanism extending over a relatively small portion of the chordwise dimension of said airfoil and extending spanwise thereof.

References Cited in the file of this patent

UNITED STATES PATENTS

| | | |
|---|---|---|
| 1,795,664 | Mellberg | Mar. 10, 1931 |
| 2,540,472 | Boyd et al. | Feb. 6, 1951 |